United States Patent
Denier

(10) Patent No.: US 10,464,687 B2
(45) Date of Patent: Nov. 5, 2019

(54) SYNCHRO MEASUREMENT SYSTEMS AND METHODS FOR DETERMINING AN ANGULAR POSITION OF A CONTROL SHAFT

(71) Applicant: THE BOEING COMPANY, Chicago, IL (US)

(72) Inventor: Robert Denier, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 429 days.

(21) Appl. No.: 14/934,234

(22) Filed: Nov. 6, 2015

(65) Prior Publication Data

US 2017/0131121 A1 May 11, 2017

(51) Int. Cl.
*G01D 5/20* (2006.01)
*H02P 6/16* (2016.01)
*B64D 43/00* (2006.01)

(52) U.S. Cl.
CPC ........... *B64D 43/00* (2013.01); *G01D 5/2073* (2013.01)

(58) Field of Classification Search
CPC ................................. G01D 5/204; B64D 43/00
See application file for complete search history.

(56) References Cited

U.S. PATENT DOCUMENTS

| | | | |
|---|---|---|---|
| 2003/0020642 A1* | 1/2003 | Ely | G01D 5/244 341/111 |
| 2008/0192528 A1* | 8/2008 | Siegert | G11C 11/22 365/145 |
| 2009/0115629 A1* | 5/2009 | Duffy | G01D 21/00 340/870.07 |
| 2009/0292501 A1* | 11/2009 | Bernard | H02P 6/16 702/151 |
| 2012/0188549 A1* | 7/2012 | Hoshino | G01N 21/3504 356/437 |
| 2015/0042321 A1* | 2/2015 | Yazdani | G01D 5/2291 324/207.18 |

* cited by examiner

*Primary Examiner* — Patrick Assouad
*Assistant Examiner* — Feba Pothen
(74) *Attorney, Agent, or Firm* — Joseph M Butscher; The Small Patent Law Group, LLC

(57) ABSTRACT

Systems and methods are provided for determining an angular position of a control shaft. The systems and methods receive at least three electrical signals from a synchro transducer coupled to a control shaft. The systems and methods further calculate two values associated with at two of the at least three electrical signals, determine an estimate of the angular position of the control shaft based on the at least two values, and generate an output signal indicative of the angular position of the control shaft based on the estimate.

20 Claims, 5 Drawing Sheets

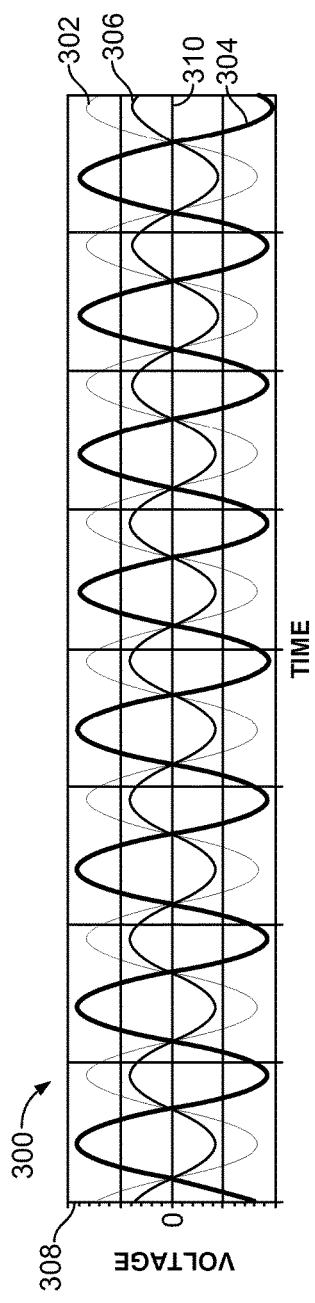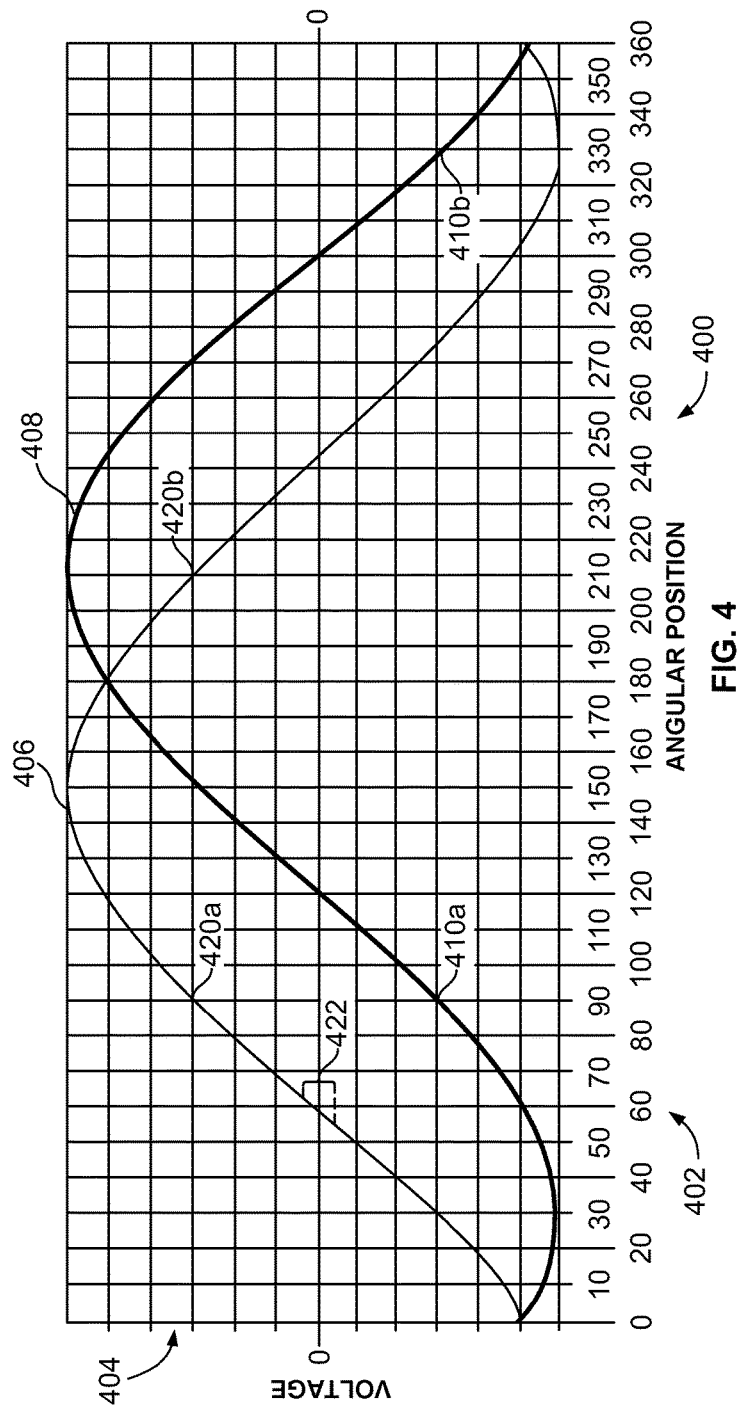

SYNCHRO MEASUREMENT SYSTEMS AND METHODS FOR DETERMINING AN ANGULAR POSITION OF A CONTROL SHAFT

FIELD OF THE DISCLOSURE

Embodiments of the present disclosure generally relate to measurement systems and methods for determining an angular position of a component.

BACKGROUND OF THE DISCLOSURE

A synchro or synchro transducer may be used to measure a position or angle of a shaft or rotor. A synchro transducer is generally a transformer having a rotor as an input or primary winding and three stators as secondary windings. The primary winding may be a wire or conductor coil extending along the rotor terminating at opposing slip rings. The three secondary windings may be wire or conductor coils positioned at three different axes around the rotor. The rotor is excited or powered by an alternating current to create a magnetic field thereby inducing a voltage for each of the secondary windings. Magnitudes of the voltages are based on an angle between the magnetic field and the corresponding stator. A dedicated hardware module of conventional analog components receive the induced voltages from the synchro transducers, and determines an angle of the rotor based on the magnitudes of the voltages. The dedicated hardware module is generally a printed circuit board (PCB) having the conventional analog components configured to determine angular measurements based on the outputs of the synchro transducer. The dedicated hardware module may be connected to an embedded system, for example, by inserting the dedicated hardware module into an expansion slot.

However, the dedicated hardware module typically limits a number of additional modules that can be connected to the embedded system. Additionally, the functionality of the analog components are typically limited by the dedicated hardware module which generally is unable to be used to perform other tasks or operations.

SUMMARY OF THE DISCLOSURE

A need exists for a system and method for replacing a dedicated hardware module for measuring an angle of a control shaft based on outputs of the synchro transducer, thereby allowing additional modules to be connected to an embedded system.

With this need in mind, certain embodiments of the present disclosure provide a system for determining an angular position of a rotatable control shaft. The system may include a synchro transducer coupled to the control shaft. The synchro transducer may be powered by a reference signal and outputs at least three electrical signals. The system may further includes a processor that receives the at least three electrical signals from the synchro transducer. The processor may be configured to determine two values associated with at least two of the at least three electrical signals. The processor may be further configured to determine an estimate of an angular position of the control shaft based upon the two values, and generate an output signal indicative of the angular position of the control shaft based upon the estimate. Optionally, the processor may determine the estimate based on, at least in part, on a look-up table. In at least one embodiment, the processor outputs the output signals to an avionics control of an aircraft.

The at least three electrical signals may correspond to three electrical waveforms. The system may include a digitizer configured to provide a digitized output of the three electrical waveforms. Optionally, the processor may filter the digitized output of the three electrical waveforms based on a frequency of the reference signal. Additionally or alternatively, the processor may determine voltage values associated with each of the at least three electrical signals from the digitized output of the three electrical waveforms.

In at least one embodiment, the processor may be configured to determine values associated with each of the at least three electrical signals from the digitized output of the three electrical waveforms. Optionally, the estimate of the angular position of the control shaft may be further based upon at least two values associated with at least two of the electrical waveforms and, at least in part, on the look-up table. Additionally or alternatively, the processor may be configured to determine if a first value of the values associated with each of the three electrical waveforms is at or within a predetermined zero threshold. The processor may select the remaining values to determine the estimate of the angular position of the control shaft.

Certain embodiments of the present disclosure provide a method to determine an angular position of a rotatable control shaft. The method may include receiving at least three electrical signals from a synchro transducer. The synchro transducer may be coupled to a control shaft. The method may further include calculating two values associated with at least two of the at least three electrical signals. The method may also include determining an estimate of the angular position of the control shaft based on the at least two values. In at least one embodiment, the estimate of the angular position is further based on a look-up table. Further, the method may include generating an output signal indicative of the angular position of the control shaft based on the estimate.

Certain embodiments of the present disclosure provide a method to determine an angular position of a rotatable control shaft. The method includes receiving at least three electrical signals corresponding to three electrical waveforms from a synchro transducer excited by a reference signal having a frequency and reference phase. The synchro transducer may be coupled to a control shaft. The method may further include digitizing the three electrical waveforms providing a digitized output of the three electrical waveforms, filtering the digitized output of the three electrical waveforms based on a frequency of the reference signal, and calculating voltage values based on the digitized output. The method may also include detecting a first phase of one of the at least three electrical waveforms based on the digitized output, adjusting a polarity of at least one of the voltage values based on the first phase and the reference phase, and determining an estimate of the angular position of the control shaft based on the voltage values. Additionally, the method may include generating an output signal indicative of the angular position of the control shaft based on the estimate.

BRIEF DESCRIPTION OF THE DRAWINGS

FIG. 3 illustrates a graphical representation based on electrical signals received from a synchro transducer and a reference signal, according to an embodiment of the present disclosure.

FIG. 4 illustrates a graphical representation of a two dimensional look-up table, according to an embodiment of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Various embodiments of the present disclosure provide systems and methods for determining an angular position of a control shaft based on electrical signals received from a synchro transducer. Embodiments of the present disclosure provide systems and methods that may utilize software modules executed by one or more processors rather than a separate dedicated hardware module of one or more conventional analog components. Embodiments of the present disclosure allow components (e.g., analog-to-digital converters 207-209 of FIG. 2) to be used for multiple tasks. The processor(s) perform one or more operations by executing programmed instructions stored on a memory device corresponding to one or more software modules.

Figure 1:
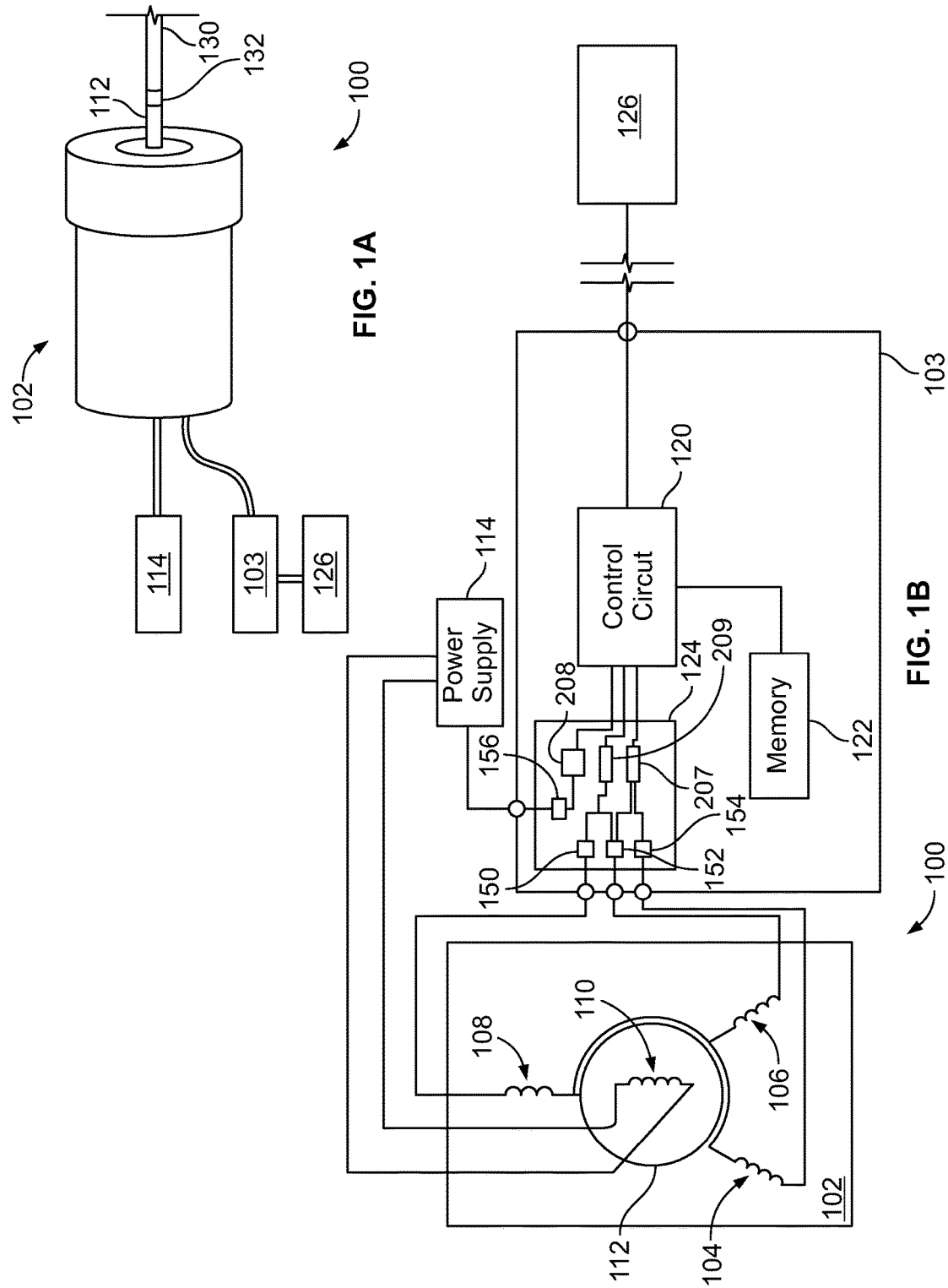
FIG. 1A illustrates a simplified diagram of a synchro measurement system for determining an angular position of a control shaft, according to an embodiment of the present disclosure.
FIG. 1B illustrates a schematic diagram of the synchro measurement system shown in FIG. 1A, according to an embodiment of the present disclosure.

FIG. 1A illustrates a simplified diagram of a synchro measurement system 100 for determining an angular position of a control shaft 130, according to an embodiment of the present disclosure. FIG. 1B illustrates a schematic diagram of the synchro measurement system 100 shown in FIG. 1A. The synchro measurement system 100 may include a synchro transducer 102 operatively coupled to a measuring unit 103 and powered by a power supply 114.

As shown in FIG. 1B, the synchro transducer 102 may include a primary winding 110 and three secondary windings 104-108. The primary winding 110 may be affixed to a rotor 112 configured to rotate within the synchro transducer 102. The rotor 112 may have a cylindrical shape, such as a tubular shaft, extending within the synchro transducer 102. The rotor 112 and generally the synchro transducer 102 may be disposed adjacent and/or coupled to the control shaft 130, as shown in FIG. 1A. For example, the control shaft 130 may be operatively coupled to the rotor 112 by a fastener 132 to synchronize and/or match rotational movement of the rotor 112 with the control shaft 130. The secondary windings 104-108 may be affixed, for example, 120 degrees apart from each other to form a Y-connected stator. In at least one embodiment, the synchro transducer 120 may have more than three secondary windings 104-108. Optionally, at least a portion of the secondary windings 104-108 may be affixed at less than or greater than 120 degrees apart from each other.

The synchro transducer 102 may be powered by a reference signal supplied by the power supply 114. The reference signal may be a reference voltage that includes an alternating current at a set frequency (e.g., 400 Hz) that excites the primary winding 110, which generates a magnetic field. The magnetic field generated by the primary winding 110 induces a current and/or voltage within the secondary windings 104-108 forming the electrical signals. Electrical characteristics of the electrical signal for each of the secondary windings 104-108 may be based on the relative angle between the primary winding 110 and each of the secondary windings 104-108. For example, each electrical signal may be represented by an electrical waveform representing voltage or current over time. An amplitude of each electrical waveform may be based on the relative angle between the primary winding 110 and the secondary windings 104-108. The synchro transducer 102 outputs the electrical signals corresponding to a current or voltage of the secondary windings 104-108, which is received by the measuring unit 103. In at least one embodiment the measuring unit 103 may receive electrical signals from more than one synchro transducer 102. For example, the measuring unit 103 may receive electrical signals from two synchro transducers 102.

The measuring unit 103 may include a controller circuit 120, an analog interface 124, and a memory 122. The memory 122 may store data or other information as desired or needed, such as firmware or software corresponding to, for example, programmed instructions (e.g., for the controller circuit 120). The memory 122 may be a tangible and non-transitory computer readable medium such as a flash memory, RAM, ROM, EEPROM, and/or the like.

The analog interface 124 may include a set of analog-to-digital converters (ADC) (e.g., the ADCs 207-209), analog filters (e.g., the analog filters 150-156), amplifiers, and/or the like to condition the electrical signals for the controller circuit 120. For example, the ADCs 207 and 209 may digitize the electrical waveforms of the electrical signals received from the synchro transducer 102 at a set sampling rate, which provides a digitized output of the three electrical waveforms to the controller circuit 120. The sampling rate may be set by the controller circuit 120 based on the frequency of the reference signal supplied by the power supply 114. In various embodiments, the sampling rate may be an integer multiple (e.g., 2, 3, 4) of the frequency of the reference signal. For example, if the frequency of the reference signal is 400 Hz, the controller circuit 120 may have a multiplier of 25, which may set the sampling rate of the ADCs at 10 kHz. In other embodiments, the sampling rate may be an integer multiple of or about twice the frequency of the reference signal.

In at least one embodiment, the analog interface 124 includes one or more analog filters 150-156 electrically coupled to the inputs of the ADCs 207-209. For example, the electrical signals may pass through the analog filter(s) 150-154 prior to being received by the ADCs 207 and 209. The analog filter(s) 150-154 may be or include a low-pass filter based on the sample rate of the ADC 207 and 209. For example, the analog filter(s) 150-154 may attenuate frequencies of the electrical signals that are about and/or approximate to half of the sample rate of the ADC 207 and 209. Additionally or alternatively, the analog filters 150-156 may be integrated with the ADCs 207-209.

The controller circuit 120 may be used to control operation of the synchro measurement system 100. The controller circuit 120 may include one or more processors. Optionally, the controller circuit 120 may include a central controller circuit (e.g., CPU), one or more microprocessors, and/or any other electronic component capable of processing inputted data according to specific logical instructions. Additionally or alternatively, the controller circuit 120 may execute instructions (e.g., software modules) stored on a tangible and non-transitory computer readable medium, such as the memory 122 or a memory integrated with the controller circuit 120 (e.g., RAM, ROM, EEPROM).

Optionally, in various embodiments, one or more components of the measuring unit 103 may be integrated with the controller circuit 120 to form a system on chip (SoC). The SoC may be an integrated circuit (IC) such that all components of the SoC are on a single chip substrate (e.g., a single silicon die, a chip). For example, the SoC may be a mixed signal array (e.g., have digital and analog inputs/outputs) having the memory 122, the controller circuit 120, and/or the analog interface 124 embedded on a single die contained within a single chip package (e.g., quad flat no-leads package (QFN), thin quad flat package (TQFP), small outline integrated circuit (SOIC), ball grid array (BGA), and/or the like).

As described below with respect to FIG. 2, the controller circuit 120 may be configured to determine two values associated with at least two of the electrical signals received by the synchro transducer 102 to determine an estimate of an angular position of the control shaft 130 based upon the two values.

Figure 2:
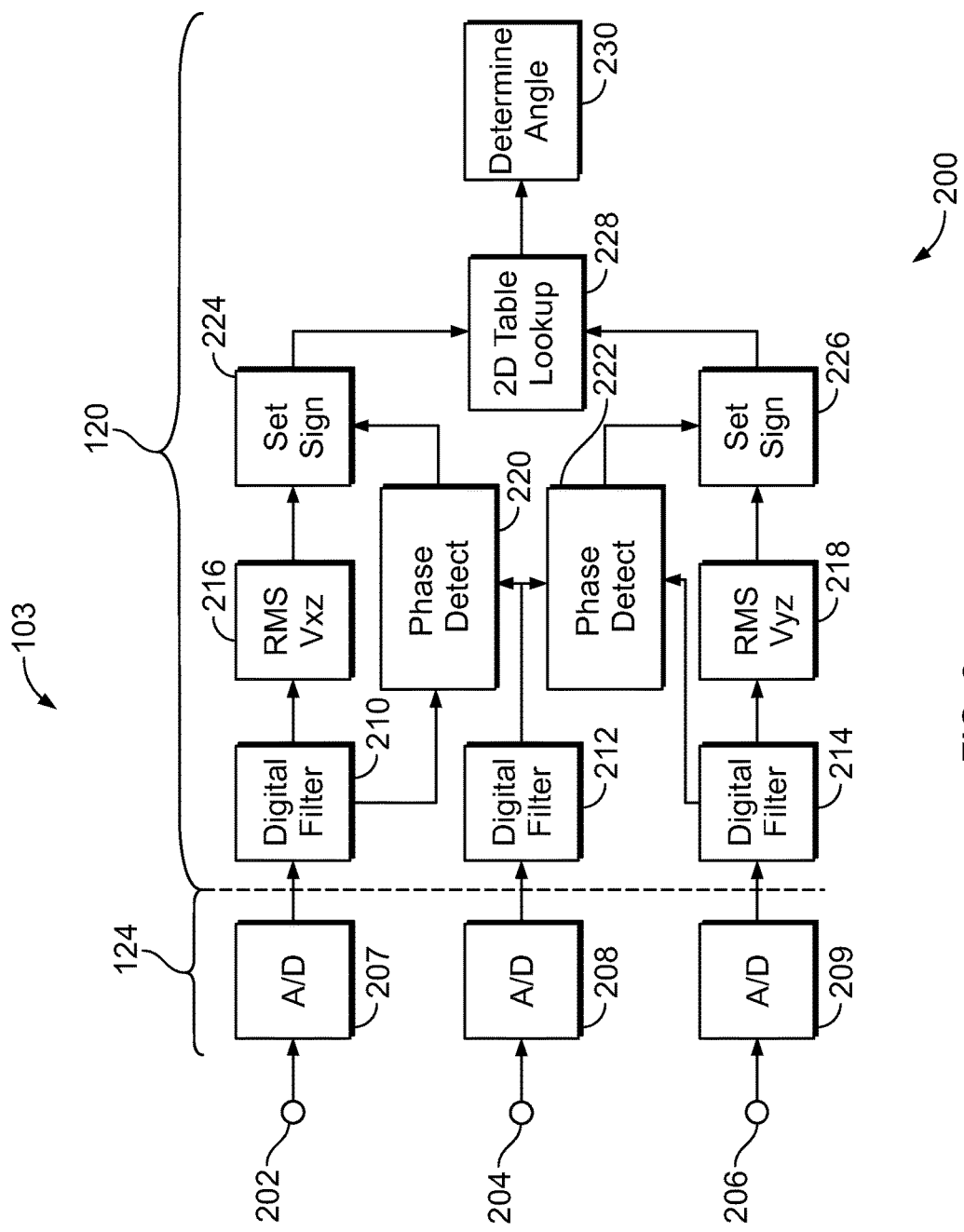
FIG. 2 illustrates a functional block diagram of a measuring unit, according to an embodiment of the present disclosure.

FIG. 2 illustrates a functional block diagram 200 of a measuring unit, in according to an embodiment of the present disclosure. For example, the functional block diagram 200 may be of the measuring unit 103 shown in FIGS. 1A-B. The functional block diagram 200 may represent one or more operations performed by components (e.g., the analog interface 124, the controller circuit 120) of the measuring unit 103. The analog interface 124 is illustrated having ADCs 207-209, which receive electrical signals at the terminals 202 and 206, and the reference signal at the terminal 204.

In operation, the terminals 202 and 206 may each receive two electrical signals from the synchro transducer 102. In at least one embodiment, one of the electrical signals received from the synchro transducer 102 may be used as a common ground or reference for both of the terminals 202 and 206. For example, electrical signals corresponding to the secondary winding 106 may be configured as the common ground by having the terminal 202 electrically coupled to the secondary windings 104 and 106, and the terminal 206 electrically coupled to the secondary windings 106 and 108. In connection with FIG. 3, the terminal 202 may have a voltage potential of the secondary winding 104 with respect to the secondary winding 106 forming an electrical waveform 302, and the terminal 206 may have a voltage potential of the secondary winding 106 with respect to the secondary winding 108 forming an electrical waveform 306.

FIG. 3 illustrates a graphical representation 300 based on electrical signals received from the synchro transducer 102 and the reference signal, according to an embodiment of the present disclosure. The electrical waveforms 302 and 306 may be formed by the electrical signals corresponding to voltage potentials of the secondary windings 104 and 108 with respect to the electrical signal voltage potential of the secondary winding 106. The electrical waveform 304 may correspond to the reference signal supplied to the primary winding 110 by the power supply 114. The electrical waveforms 302-306 are plotted along a horizontal axis 310 corresponding to time and centered by a vertical axis 308 representing a voltage or electrical potential.

Referring again to FIG. 2, the ADCs 207-209 may digitize the electrical signals and the reference signal, such as the electrical waveforms representing the electrical signals, to a digital output received by the controller circuit 120. The controller circuit 120 may filter the digitized output of the three electrical waveforms and the reference signal. In at least one embodiment, the controller circuit 120 may filter the digitized outputs based on a frequency of the reference signal.

For example, the controller circuit 120 may execute one or more programmed instructions stored in the memory 122 to select and/or implement one or more digital filters, such as finite impulse response (FIR) filters 210-214. Characteristics of the FIR filters 210-214, such as a number and magnitude of filter taps or coefficients defining the FIR filters 210-214, may be included in the programmed instructions. The FIR filters 210-214 may be configured as band pass filters, low pass filters, high pass filters, and/or the like to remove noise from the digital output of the three electrical waveforms. For example, the FIR filters 210-214 may be band pass filters configured to allow frequency components at and/or near the frequency of the reference signal, such as within a predetermined frequency band, to pass through.

In operation, the FIR filters 210-214 may attenuate portions of the digitized output corresponding to frequencies outside the predetermined frequency band. The predetermined frequency band may be stored in the memory 122 centered at the frequency of the reference signal. The predetermined frequency band may be based on a set percentage (e.g., 5%, 10%, 15%) of the frequency of the reference signal, a set frequency range, and/or the like. For example, the frequency of the reference signal may be 400 Hz, the predetermined frequency band may have a range of 30 Hz or approximately 7% of the reference signal frequency corresponding to a predetermined frequency band from 385 Hz to 415 Hz. Additionally or alternatively, the set percentage corresponding to the predetermined frequency band may be greater than or less than 7%.

Additionally or alternatively, the FIR filters 210-214 may have a set maximum delay. The delay may be based on the number of filter taps or coefficients defining the FIR filters 210-214, and a sampling frequency of the FIR filters 210-214. For example, the delay of the FIR filters 210-214 may be set at 37.5 ms corresponding to 375 filter taps at a sampling frequency of 10 kHz. Optionally, the sampling frequency and the filter taps may be configured such that the FIR filters 210-214 have sampling frequencies that match and/or are approximately the same as the sampling rate of the ADCs 207-209.

Voltage values corresponding to a root mean square (RMS) value may be calculated by the controller circuit 120 based on the filtered digitized output of the FIR filters 210-214. In at least one embodiment, the controller circuit 120 may determine a voltage value associated with each of at least three electrical signals from the digitized output of the three electrical waveforms. For example, the voltage values may be determined based on a RMS value calculation 216, 218 of the digitized output of the three electrical waveforms. The controller circuit 120 may determine an RMS value based on Equation 1. For example, the controller circuit 120 may determine the RMS value for a sample set, corresponding to a variable n. The number of samples within the sample set may be based on a cycle (e.g., period) of the reference signal cycle and the sampling rate.

$$V_{RMS} = \sqrt{\frac{(V_1^2 + V_2^2 + \ldots + V_n^2)}{n}} \qquad \text{Equation (1)}$$

For example, the reference signal may have a frequency of 400 Hz or cycle of 2.5 ms. The controller circuit 120 may configure the ADCs 207 and 209 and/or the digital filters 210 and 214 to have a sampling rate of 10 kHz, which corresponds to 25 samples for each cycle. Each sample of the ADC 207, 209 and/or digital filter 210, 214 corresponds to a voltage or electrical potential associated with the electrical signals received at the terminals 202 and 206 or the digitized output. The controller circuit 120 may select a number of cycle sets to form the sample set n. For example, the controller circuit 120 may define each sample set at a polling interval, such as 50 ms, which corresponds to a sample set n of 500 samples. Optionally, the controller circuit 120 may adjust the sampling rate and/or the polling interval to tune or change the accuracy of the RMS calculation. For example, increasing the sampling rate of the ADCs 207 and 209 and/or the digital filters 210 and 214 may increase the accuracy of the RMS measurement. It should be noted that in various embodiments, the controller circuit 120 may fix and/or have the sampling rate of the ADCs 207 and 209 and the configuration of the FIR filters 210-214 remain constant within a set threshold when collecting the sample set n. In another example, increasing the polling interval may also increase the accuracy of the RMS measurement, but may also increase a number of samples within the sample set, which increases the calculation time to determine the RMS value calculation 216, 218.

The controller circuit 120 may further perform a phase detection 220, 222 of the filtered digitized output of the electrical waveforms. In operation, to determine the RMS value, the controller circuit 120 may square the voltage potential of each sample, which removes the polarity of the voltage (e.g., negative, positive) corresponding to the phase information. The phase may correspond to an offset of the electricals signals relative to the reference signal, for example, based on the voltage polarity. The controller circuit 120 may compare the voltage polarities of the filtered digitized output of the electrical waveforms with the voltage polarities of the filtered digitized output of the reference signal. If the voltage polarities are the same between the electrical waveform and the reference signals for at least a phase threshold (e.g., over half or 50% of the time) the controller circuit 120 may determine that the electrical signal and the reference signal are in phase.

In at least one embodiment, the controller circuit 120 may determine that the polarity of the electrical waveforms 302 and 306 (shown in FIG. 3) associated with the electrical signals output by the synchro transducer 102 are out of phase with the electrical waveform 304 representing the reference signal. For example, the voltage polarity of the electrical waveforms 302 and 306 mirror the voltage polarity of the electrical waveform 304 about the horizontal axis 310. The length of the electrical waveforms 302 and 306 that have opposing voltage polarities with respect to the electrical waveform 304 may be compared by the controller circuit 120 to a phase threshold. The phase threshold may be used by the controller circuit 120 to determine when the electrical waveforms 302 and 306 are not in phase with the electrical waveform 304. For example, the phase threshold may correspond to a fifty percent threshold. In operation, when the controller circuit 120 determines that the voltage polarities for over half (e.g., above the phase threshold) of the electrical waveform 302 are mirrored or different than the voltage polarities of the electrical waveform 304, the controller circuit 120 may determine that the electrical waveform 302 is not in phase with the electrical waveform 304.

Based on the phase detection 220, 222 of the electrical waveforms 302 and 306, the controller circuit 120 may perform a set sign or polarity operation 224, 226 to the RMS value based on the RMS value calculation 216, 218 to form a modified RMS value (MRMS). The MRMS value corresponds to an RMS value with sign or polarity information representing a phase of the electrical waveform 302, 306 with respect to the electrical waveform 304 representing the reference signal. For example, if the controller circuit 120 determines that the digitized signals corresponding to the electrical waveforms of the terminal 202 are out of phase with respect to the reference signal, the controller circuit 120 may adjust or set the polarity 224 of the RMS value negative. By adjusting or setting the polarity 224 negative, the controller circuit 120 is defining the MRMS value. The negative polarity of the MRMS value indicates that the electrical waveform 302, 306 is out of phase with respect to the electrical waveform 304. In another example, if the controller circuit 120 determines that the digitized signals corresponding to the electrical waveforms of the terminal 206 are in phase with respect to the reference signal, the controller circuit 120 may not adjust the polarity to form a MRMS value with a positive polarity.

The controller circuit 120 may estimate or determine an angular position 230 of the control shaft 130 or generally the rotor 112 based on at least two values associated with at least two of the electrical waveforms. In at least one embodiment, the controller circuit 120 may compare the values with a look-up table 228 to determine the angular position 230. The look-up table 228 may be stored in the memory 122 and include a collection of candidate angle estimations with corresponding MRMS values. The look-up table 228 may have two dimensions (2D) corresponding to the electrical signals of each terminal 202 and 206. For example, the look-up table 228 may include a first collection of candidate angle estimations and a second collection of candidate angle estimations. The first collection of candidate angle estimations may correspond to MRMS values associated with the electrical signals of the terminal 202, and the second collection of candidate angel estimations may correspond to MRMS values associated with the electrical signals of the terminal 206. Accordingly, the control circuit 120 may determine a voltage value such as an MRMS value associated with a first electrical signal at terminal 202, and determine from a commensurate MRMS value in the look-up table 228 a corresponding candidate angle for the first electrical signal at terminal 202 from the first collection of candidate values in the look-up table 228. Likewise, the control circuit 120 may determine a voltage value such as an MRMS value associated with a second electrical signal at terminal 206, and determine from a commensurate MRMS value in the look-up table 228 a corresponding candidate angle for the second electrical signal at terminal 206 from the second collection of candidate value in the look-up table 228.

In connection with FIG. 4, the 2D look-up table 228 may be based on a theoretical template profile of generated MRMS values of the electrical signals at the terminals 202 and 206 for a range of angular positions, represented by the variable θ, as defined by Equations (2) and (3).

$$V_{xz}(\theta) = \sqrt{2} \cdot 11.8 \sin(\theta+240)$$ Equation (2)

$$V_{yz}(\theta) = -\sqrt{2} \cdot 11.8 \sin(\theta+120)$$ Equation (3)

FIG. 4 illustrates a graphical representation 400 of a two dimensional (2D) look-up table. For example, the graphical representation 400 may be a portion of the 2D look-up table 228 (shown in FIG. 2) plotted over a horizontal axis 402 representing an angular position (e.g., from zero to 360 degrees) and a vertical axis 404 representing an MRMS voltage, based on the values calculated from Equation 2 and Equation 3. The graphical representation 400 includes two profiles 406 and 408 corresponding to the electrical signals of the terminals 202 and 206 (shown in FIG. 2). For example, the profile 406 may correspond to the terminal 206 derived from Equation 3 and the profile 408 may correspond to the terminal 202 derived from the Equation 2.

Based on the MRMS values, the controller circuit 120 may estimate an angle of the rotor 112 and thereby the control shaft 130. For example, as described above, the rotor 112 (shown in FIG. 1A) is coupled to the control shaft 130 by the fastener 132, which synchronizes and/or matches a rotational movement of the rotor 112 with the control shaft 130. The controller circuit 120 may determine that the MRMS value associated with the electrical signals of the terminal 202 is approximately −8.34 volts based on Equation 1, and a MRMS associated with the electrical signals of the terminal 206 is approximately 8.34 volts. It should be noted that in various embodiments each MRMS value may correspond to two possible angular positions.

For example, the controller circuit 120 may identify the MRMS value of 8.34 volts within the 2D look-up table 228, for example at references 420a-b on the profile 406, corresponding to the terminal 206. The MRMS value of 8.34 volts may correspond to two candidate angular positions 90 and 210 degrees. In various embodiments, to resolve the multiple angular positions, the controller circuit 120 may compare the candidate angular positions corresponding to the MRMS values of the two terminals 202 and 206, and select common and/or approximately the same angular positions from each terminal 202, 206.

For example, the controller circuit 120 may identity the MRMS value of −8.34 volts within the 2D look-up table 228, for example at references 410a-b on the profile 408, corresponding to the terminal 202. The MRMS value of −8.34 volts may correspond to a candidate angular position of 90 degrees and 330 degrees. The controller circuit 120 may select the candidate angular positions from each terminal 202 and 206 that are approximately the same, for example the candidate angular position of 90 degrees of terminals 202 and 206. Optionally, the controller circuit 120 may determine a mean and/or average value of the two selected candidate angular positions from each terminal 202 and 206 to determine the estimate of the angular position of the control shaft 130.

Additionally or alternatively, the controller circuit 120 may determine an estimate of the angular position of the control shaft 130 based on one of the MRMS values. In at least one embodiment, the controller circuit 120 may select one of the two candidate angular positions corresponding to the MRMS value of the terminal 202, 206 based on a previous angular position of the control shaft 130. For example, the controller circuit 120 may select the candidate angular position that is more proximate and/or closest to the previous angular position with respect to the alternative candidate angular position.

In at least one embodiment, the controller circuit 120 may select one of the two candidate angular positions based on a select range of the control shaft 130. For example, the controller circuit 120 may receive a trigger signal from the synchro transducer 102 when the control shaft 130 is greater than a predetermined angle, such as 180 degrees, or within a set degree range, such as from zero to 150 degrees or 30 to 210 degrees.

The controller circuit 120 may generate an output signal indicative of the angular position of the control shaft 130, and transmit the output system to a remote system, such as an avionics control 126 (shown in FIG. 1), based on the estimate. For example, the output signal may be a numerical value. Optionally, the output signal may be a graphical icon or indicator representing the angular position. The avionics control 126 may be electrically coupled to the controller circuit 120. The avionics control 126 may correspond to a main navigation system of an aircraft, such as the aircraft 540 shown in FIG. 6, a power system, and/or the like.

In at least one embodiment, the 2D look-up table 228 may increase accuracy of the estimated angle by the controller circuit 120. For example, when MRMS values associated with the electrical signals of one of the terminals 202, 206 are at or approximately zero (e.g., based on predetermined zero threshold), the signal to noise ratio may be too low, thereby affecting the confidence of the MRMS value in estimating the angular position of the control shaft 130. For example, when the rotor 112 is positioned at 60 degrees and 240 degrees, the electrical signals, and thereby the MRMS values, of the terminal 202 may be approximately zero. In another example, when the rotor 112 is positioned at 120 degrees and 300 degrees, the electrical signals, and thereby the MRMS values, of the terminal 206 may be approximately zero. When one of the MRMS values are at or within a predetermined amount of zero based on the predetermined zero threshold, the controller circuit 120 may estimate the angular position based on the remaining MRMS value to determine the angular position of the control shaft 130.

The predetermined amount of zero may be a voltage range or threshold of MRMS values associated with a degree range. For example, a predetermined zero threshold 422 corresponding to the profile 406 is shown in FIG. 4. The predetermined zero threshold 422 may extend from −1.74 volts to 1.74 volts of the profile 406 corresponding to an eight degree range from 56 degrees to 64 degrees centered at the zero voltage occurring at 60 degrees. When the controller circuit 120 determines that the MRMS values of the terminal 206 are at and/or within the predetermined zero threshold 422, the controller circuit 120 may estimate the angular position based on the remaining MRMS value corresponding to the terminal 202 and the profile 408.

Additionally or alternatively, the predetermined zero threshold may correspond to a range of degrees of angular positions. For example, when the controller circuit 120 determines the estimated angular position based on the MRMS values of the terminal 206 is at and/or within the predetermined zero threshold, such as between 56-64 degrees, the controller circuit 120 may estimate the angular position based on the remaining MRMS value corresponding to the terminal 202 and the profile 408. In other embodiments, the predetermined zero threshold may be associated with a degree range greater than eight or less than eight.

Additionally or alternatively, the look-up table 228 may be formed from a template look-up table. For example, the template look-up table, a portion of which is shown graphically in FIG. 4, may be derived from the Equations 2 and 3. The controller circuit 120 may adjust the template look-up table based on positioning the rotor 112 at a predetermined angular position. For example, the controller circuit 120 may be configured to enter a calibration mode. During the calibration mode, the rotor 112 may be manually positioned at set angular positions. The controller circuit 120 may calculate MRMS values associated with the electrical signal of the terminals 202 and 206 for each of the set angular positions. The controller circuit 120 may adjust the MRMS values corresponding to the set angular positioned in the template look-up table to match the calculated MRMS values during the calibration mode.

In at least one embodiment, the controller circuit 120 may select a look-up table 228 from a plurality of candidate look-up tables stored in the memory 122 based on a model and/or manufacturer of the synchro transducer 102.

Figure 5:
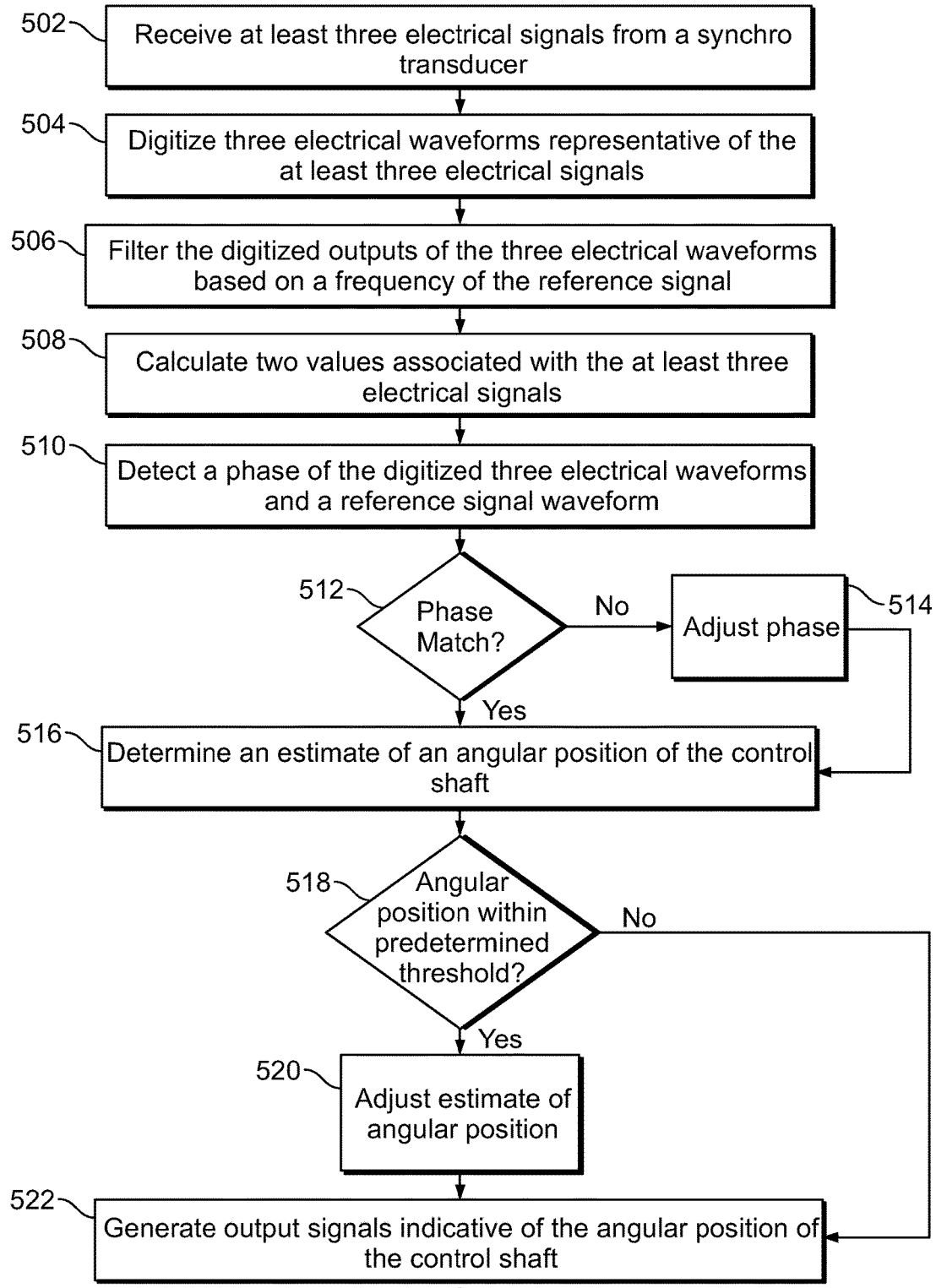
FIG. 5 illustrates a flow chart of a method to determine an angular position of a rotatable control shaft, according to an embodiment of the present disclosure.

FIG. 5 illustrate a flowchart of a method 500 for determining an angular position of a rotatable control shaft 130, according to an embodiment of the present disclosure. The method 500, for example, may employ structures or aspects of various embodiments (e.g., systems and/or methods) discussed herein. For example, the controller circuit 120 of FIG. 1B may be configured to operate according to the flow chart shown in FIG. 5. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 500 may be used as one or more algorithms corresponding to firmware and/or software to direct hardware, such as one or more processors, to perform one or more operations described herein.

Embodiments of the present disclosure may receive at least three electrical signals from a synchro transducer, calculate two values associated with the at least three electrical signals, determine an estimate of an angular position of a control shaft coupled to the synchro transducer based on the at least two values, generate an output signal indicative of the angular position of the control shaft, and transmit the output signal to a remote system, such as an avionics control, based on the estimate.

Beginning at 502, the controller circuit 120 may receive at least three electrical signals form the synchro transducer 102. For example, the at least three electrical signals may be associated with an induced current and/or voltage of the secondary windings 104, 106, and 108 in response to a magnetic field generated by the primary winding 110 excited by a reference signal. The reference signal may be a reference voltage which includes an alternating current at a set frequency (e.g., 400 Hz) generated by the power supply 114. The synchro transducer 102 may output the electrical signals to the terminals 202 and 206, which are electrically coupled to the controller circuit 120.

At 504, the analog interface 124 may digitize three electrical waveforms representative of the three electrical signals. For example, the three electrical signals may correspond to electrical waveforms representing a changing voltage and/or current over time. Optionally, one of the electrical signals may be used as a reference or common ground for the other two electrical signals to form the electrical waveforms 302 and 306. The analog interface 124 may include ADCs, such as the ADC 207 and 209, which receive and digitize the electrical waveforms representative of the electrical signals. For example, the ADCs generate digital values representing a voltage of a sample of the electrical waveform selected at a sample rate of the ADC. The sample rate may be based on a frequency of the reference signal supplied by the power supply 114. The digital values generated by the ADC are included in a digitized output of the three electrical waveforms, and may be received by the control circuit 120.

At 506, the controller circuit 120 may filter the digitized output of the three electrical waveforms based on a frequency of the reference signal. For example, the controller circuit 120 may execute instructions stored in the memory 122 to form a digital filter, such as the FIR filters 210 and 214.

At 508, the controller circuit 120 may calculate two values associated with the at least three electrical signals. For example, the controller circuit 120 may perform a RMS value calculation 216, 218 to the digitized output of the three electrical waveforms associated with the at least three electrical signals.

At 510, the controller circuit 120 may detect a phase of the digitized three electrical waveforms and a reference signal waveform. For example, the controller circuit 120 may compare voltage polarities of the digitized three electrical waveforms with the voltage polarity of the reference signal waveform (e.g., the electrical waveform 304).

At 512, the controller circuit 120 determines whether the phases of the three electrical waveforms match the phase of the reference signal waveform. For example, if the voltage polarity of the electrical waveform is the same as the reference signals for at least a phase threshold (e.g., over half or 50% of the time) the controller circuit 120 may determine that the electrical waveform the reference signal waveform are in phase.

If the phases do not match, at 514, the controller circuit 120 adjusts the polarity of the value corresponding to the electrical waveform. For example, the controller circuit 120 may multiply the value (e.g., the RMS value) by −1 thereby modifying the value to include the phase information (e.g., an MRMS value).

At 516, the controller circuit 120 determines an estimate of an angular position of the control shaft 130. For example, the controller circuit 120 may compare the values determined at 508 with the 2D look-up table 228, which includes a plurality of candidate angular positions with corresponding values. The controller circuit 120 may identify two candidate angular positions having corresponding values that match the two values determined at 508. The controller circuit 120 may determine a mean and/or average value of the two candidate angular positions selected based on the 2D look-up table 228 to determine the estimate of the angular position of the control shaft 130.

At 518, the controller circuit 120 determines whether the angular position is within a predetermined zero threshold (e.g., the predetermined zero threshold 422 of FIG. 4). The predetermined zero threshold may correspond to ranges of angular positions (e.g., 60 degrees, 120 degrees, 240 degrees, 300 degrees) having at least one value (e.g., voltage values) associated with the three electrical signals that are approximately zero. The ranges of angular positions of the predetermined zero threshold may correspond to positions of the rotor 112 where the signal to noise ratio may be low, thereby affecting one of the values determined at 508. For example, at angular positions where the values, based on the Equations 2 and 3, are zero, noise generated by remote systems operatively coupled to the synchro transducer system 100, such as the avionics control 126 may increase noise and/or affect the value reducing the accuracy of the estimation of the angular position at 516.

The ranges of angular positions of the predetermined zero threshold may be centered at angular positions corresponding to zero values of the Equations 2 (e.g., 120 degrees, 300 degrees) and Equation 3 (e.g., 60 degrees, 240 degrees) with a predetermined range, such as ten. For example, the predetermined zero threshold may include the angular positions 115 degrees to 125 degrees centered at 120 degrees, and 295 degrees to 305 degrees centered at 300 degrees. It should be noted that in other embodiments the predetermined zero threshold may be associated with a degree range greater than ten or less than ten.

When one of the values, determined at 508, or angular position, determined at 516, is within the predetermined zero threshold, the controller circuit 120, at 520, may adjust the estimate of the angular position. For example, the controller circuit 120 may determine that when the angular position estimated at 516 is within the predetermined zero threshold one of the values associated with the three electrical signals may have a low signal to noise ratio. The controller circuit 120 may adjust the estimate of the angular position by selecting the remaining value for determining the estimate of the angular position of the control shaft 130. For example, the controller circuit 120 may adjust the estimated angular position determined at 516 to only include the candidate angular position corresponding to the value that is not within the predetermined zero threshold.

At 522, the controller circuit 120 generates an output signal indicative of the angular position of the control shaft 130. For example, the controller circuit 120 may output a numerical value corresponding to the angular position, a graphical indicator showing a position of the control shaft 130 with the angular position, and/or the like. The output signal may be received by the avionics control 126, for example. In connection with FIG. 6, the avionics control may control and/or be communicatively coupled to one or more systems of an aircraft 540.

Figure 6:
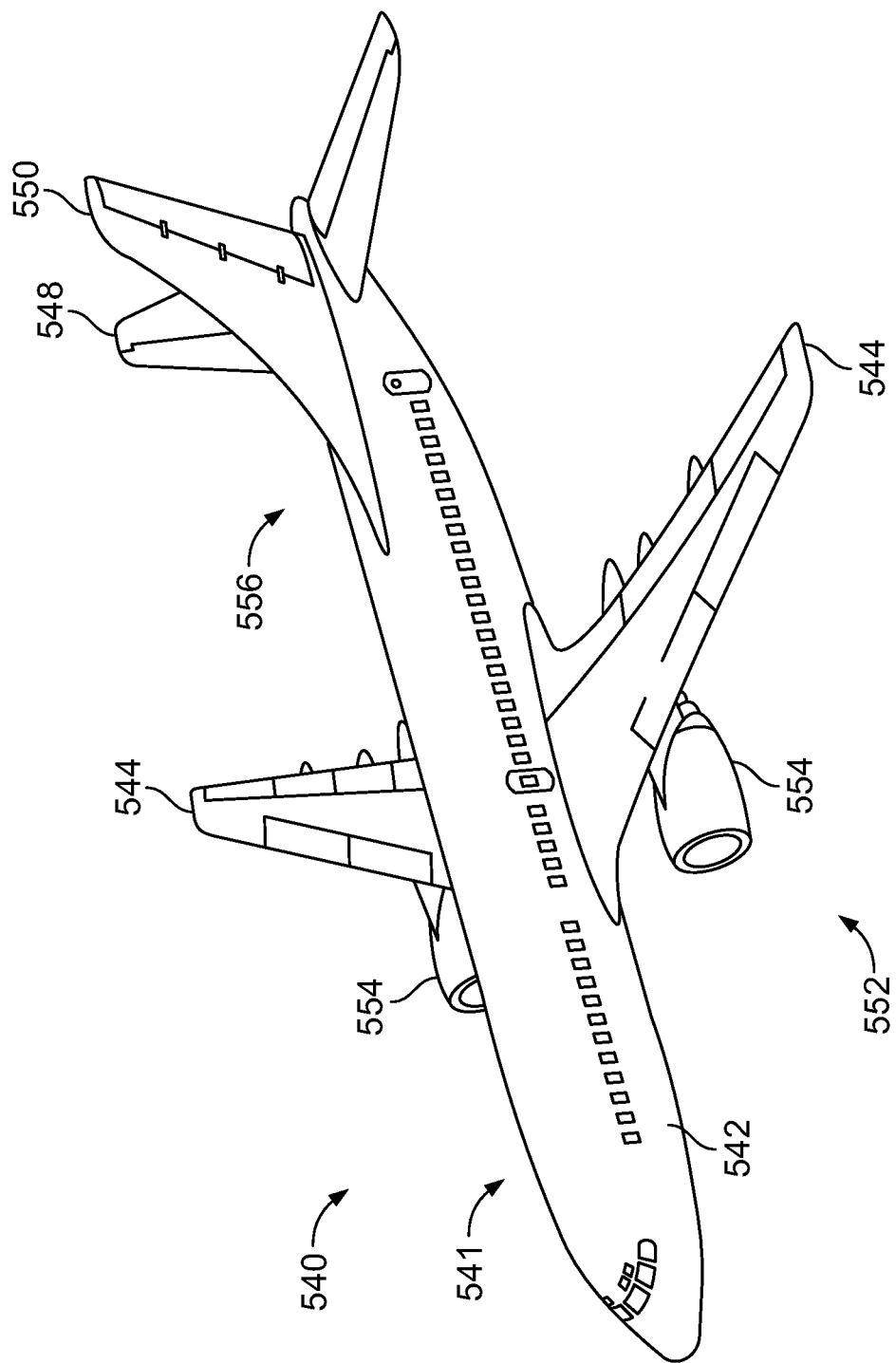
FIG. 6 illustrates a perspective top view of an aircraft, according to an embodiment of the present disclosure.

FIG. 6 illustrates a perspective top view of an aircraft 540, according to an embodiment of the present disclosure. The aircraft 540 includes various structures and/or control systems that may be measured by the synchro measurement system 100 (shown in FIG. 1) to determine an angular position of the control shaft 130. For example, the control shaft 130 may measure one or more indicator gauges, such as flow gauges, for a propulsion system 552 of the aircraft 540. In another example, the control shaft 130 may measure a velocity and/or acceleration of the two turbofan engines 554, which are a part of the propulsion system 552. The aircraft 540 may include a main structure 541 having the propulsion system 552. The engines 554 are carried by the wings 544 of the aircraft 540. In other embodiments, the engines 554 may be carried by the fuselage 542 and/or the empennage 556. The empennage 556 may also support horizontal stabilizers 548 and a vertical stabilizer 550.

It should be noted that the synchro measurement system and methods described above may be used with various other vehicles other than aircraft. For example, the systems and methods described herein may be used with land based vehicles (such as automobiles, trains, and the like), water craft (such as boats), spacecraft, and the like. In other embodiments, the systems and methods described herein may be used with respect to various assemblies, systems, and structures that may not be part of vehicles.

As described above, embodiments of the present disclosure provide systems and methods for determining an angular position of a control shaft based on electrical signals received from a synchro transducer. Embodiments of the present disclosure provide systems and methods based on software that may be executed by one or more processors rather than a separate hardware only module of conventional analog components.

As used herein, the term "controller circuit," "unit," "central processing unit," "CPU," "computer," or the like may include any processor-based or microprocessor-based system including systems using microcontrollers, software, or a combination thereof capable of executing the functions described herein. Such are exemplary only, and are thus not intended to limit in any way the definition and/or meaning of such terms. For example, the controller circuit 120 may be or include one or more processors that are configured to control operation of the synchro measurement system 100.

The set of instructions may include various commands that instruct the controller circuit 120 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the controller circuit 120. It is to be understood that the processing or controller circuit may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include electronic circuits that include and/or are connected to one or more logic-based devices, such as microprocessors, processors, controllers, or the like. Optionally, the controller circuit 120 may represent processing circuitry such as a microcontroller, microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program and/or software module stored in memory for execution by a controller circuit 120, one or more processors and/or the like, including RAM memory, ROM memory, EPROM memory, EEPROM memory, and non-volatile RAM (NVRAM) memory. The above memory types are exemplary only, and are thus not limiting as to the types of memory usable for storage of a computer program.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for determining an angular position of a control shaft comprising:
a synchro transducer coupled to the control shaft, wherein the synchro transducer outputs at least three electrical signals; and
a processor that receives the at least three electrical signals, wherein the processor determines two values associated with at least two of the electrical signals, and an estimate of the angular position of the control shaft based upon the two values, the processor compares the two values with a two dimensional (2D) look-up table to identify two candidate angular positions that match the two values based on the 2D look-up table, the processor determines whether one of the two values associated with each of the at least two electrical signals is within a predetermined zero threshold, and the processor generates an output signal indicative of the angular position of the control shaft based on the one of the two values that is within the predetermined zero threshold.

2. The system of claim 1, wherein the processor outputs the output signal to an avionics control of an aircraft.

3. The system of claim 1, wherein the processor generates the estimate based, at least in part, on the 2D look-up table, wherein the 2D look-up table is a template profile of generated modified root mean square (MRMS) values based on the two values.

4. The system of claim 1, further comprising a digitizer and a reference signal, wherein the reference signal powers the synchro transducer, the digitizer being configured to have a sampling rate based on the frequency of the reference signal, the digitizer providing a digitized output of the three electrical waveforms.

5. The system of claim 1, wherein the synchro transducer is powered by a reference signal, and the processor is configured to filter the digitized output of the three electrical waveforms at a sampling frequency based on a frequency of the reference signal.

6. The system of claim 4, wherein the processor determines voltage values of the two values associated with each of the at least three electrical signals from the digitized output of the at least three electrical waveforms.

7. The system of claim 4, wherein the processor determines the two values associated with each of the at least three electrical signals from the digitized output of the at least three electrical waveforms.

8. The system of claim 7, wherein the processor determines the estimate based upon the two values associated with the at least two of the electrical waveforms and the 2D look-up table.

9. The system of claim 1, wherein the processor adjusts the estimate of the angular position by selecting a second value of the two values that includes a low signal to noise ratio and is not within the predetermined zero threshold.

10. A method to determine an angular position of a control shaft, the method comprising:
receiving at least three electrical signals from a synchro transducer, wherein the synchro transducer is coupled to the control shaft;
calculating two values associated with at least two of the at least three electrical signals;
determining an estimate of the angular position of the control shaft based on the two values;
comparing the two values with a two dimensional (2D) look-up table to identify two candidate angular positions that match the two values based on the 2D look-up table;
determining whether one of the two values associated with each of the at least two electrical signals is within a predetermined zero threshold; and
generating an output signal indicative of the angular position of the control shaft based on the one of the values that is within the predetermined zero threshold.

11. The method of claim 10, wherein the output signal is received by an avionics control of an aircraft.

12. The method of claim 10, further comprising generating the 2D look-up table, wherein the 2D look-up table is a template profile of generated modified root mean square (MRMS) values based on the two values.

13. The method of claim 10, further comprising supplying a reference signal to the synchro transducer and digitizing the at least three electrical signals, the digitizer being configured to have a sampling rate based on a frequency of the reference signal, wherein the digitizer provides a digitized output of the at least three electrical waveforms.

14. The method of claim 13, further comprising filtering the digitized output of the at least three electrical waveforms at a sampling frequency based on the frequency of the reference signal.

15. The method of claim 13, further comprising determining voltage values of the two values associated with each of the at least three electrical signals from the digitized output of the at least three electrical waveforms.

16. The method of claim 13, wherein the synchro transducer is powered by the reference signal having a reference phase, and further comprising:
detecting a first phase of the digitized output with respect to the reference signal; and
adjusting a polarity of the first phase based on the reference phase.

17. The method of claim 13, further comprising determining the two values associated with each of the at least three electrical signals from the digitized output of the three electrical waveforms.

18. The method of claim 17, wherein the estimate of the angular position of the control shaft is further based upon at least two values associated with the at least two of the electrical waveforms and, at least in part, on the (2D) look-up table.

19. The method of claim 1, further comprising adjusting the estimate of the angular position by selecting a second value of the two values that includes a low signal-to-noise ratio and is not within the predetermined zero threshold.

20. A method to determine an angular position of a control shaft, the method comprising:
receiving at least three electrical signals corresponding to three electrical waveforms from a synchro transducer excited by a reference signal having a frequency and reference phase, wherein the synchro transducer is coupled to the control shaft;
digitizing the three electrical waveforms providing a digitized output of the three electrical waveforms;
filtering the digitized output of the three electrical waveforms based on the frequency of the reference signal;
calculating voltage values based on the digitized output;
determining an estimate of the angular position of the control shaft based on the voltage values and a two dimensional (2D) look-up table, wherein the determining comprises comparing the voltage values with a two dimensional (2D) look-up table to identify candidate angular positions that match the voltage values based on the 2D look-up table, and determining whether one of the voltage values is within a predetermined zero threshold; and
generating an output signal indicative of the angular position of the control shaft based on the estimate.

* * * * *